United States Patent
Hanks

(10) Patent No.: US 12,268,990 B2
(45) Date of Patent: Apr. 8, 2025

(54) REVERSE OSMOSIS FILTER SYSTEM

(71) Applicant: James Benjamin Hanks, Highland, UT (US)

(72) Inventor: James Benjamin Hanks, Highland, UT (US)

( * ) Notice: Subject to any disclaimer, the term of this patent is extended or adjusted under 35 U.S.C. 154(b) by 88 days.

(21) Appl. No.: 17/544,894

(22) Filed: Dec. 7, 2021

(65) Prior Publication Data
US 2022/0176317 A1   Jun. 9, 2022

Related U.S. Application Data

(60) Provisional application No. 63/122,123, filed on Dec. 7, 2020.

(51) Int. Cl.
*B01D 61/04* (2006.01)
*B01D 61/02* (2006.01)
(Continued)

(52) U.S. Cl.
CPC .......... *B01D 61/04* (2013.01); *B01D 61/025* (2013.01); *B01D 61/08* (2013.01); *B01D 61/10* (2013.01); *B01D 65/08* (2013.01); *B01D 2311/04* (2013.01); *B01D 2311/2649* (2013.01); *B01D 2313/13* (2013.01); *B01D 2313/2011* (2022.08);
(Continued)

(58) Field of Classification Search
CPC .......... C02F 1/002; C02F 1/283; C02F 1/441; C02F 1/444; C02F 1/003; C02F 2307/02; C02F 2201/006; C02F 9/20; C02F 1/001; C02F 1/281; B01D 61/025; B01D 2319/02; B01D 2313/086; B01D 2313/12; B01D 2313/21; B01D 2313/20; B01D 2313/44; B01D 2319/025; B01D 2319/06; B01D 2313/08; B01D 61/029; B01D 61/08; B01D 61/081; B01D 2311/04; B01D 2313/10; B01D 61/04; B01D 2313/901; B01D 2201/291; B01D 2311/2626; B01D 2313/40; B01D 29/58; A45F 2003/163
See application file for complete search history.

(56) References Cited

U.S. PATENT DOCUMENTS 5,681,463 A * 10/1997 Shimizu ................ B01D 61/18
                                                     210/282
6,203,697 B1 * 3/2001 Ferguson ............. B01D 35/303
                                                     210/232
(Continued)

FOREIGN PATENT DOCUMENTS

CN   210030221 U   * 2/2020
JP   2009-220070     * 10/2009

OTHER PUBLICATIONS

English language machine translation of JP2009-220070, 8 Pages, No Date.*

*Primary Examiner* — Pranav N Patel
(74) *Attorney, Agent, or Firm* — Kunzler Bean & Adamson

(57) ABSTRACT

Various reverse osmosis (RO) filter systems are disclosed herein. The RO filter systems can include one or more RO filters connected to and in fluid communication with an end cap filter component and/or a fluid turbine component. Some RO filter systems can further include a filter component connected to and in fluid communication with the one or more RO filters and/or a fluid turbine component. Additional RO filter systems can further include a pre-filter component connected to the filter component.

20 Claims, 8 Drawing Sheets

(51) Int. Cl.
*B01D 61/08* (2006.01)
*B01D 61/10* (2006.01)
*B01D 65/08* (2006.01)

(52) U.S. Cl.
CPC .... *B01D 2313/21* (2013.01); *B01D 2313/246* (2013.01)

(56) References Cited

U.S. PATENT DOCUMENTS

| | | | |
|---|---|---|---|
| 7,862,720 B2 * | 1/2011 | Brown | C02F 1/002 210/473 |
| 2009/0314703 A1 * | 12/2009 | Beach | B01D 61/0022 210/232 |
| 2011/0284479 A1 * | 11/2011 | O'Brien | C02F 1/002 210/764 |
| 2014/0014579 A1 * | 1/2014 | Haruna | C02F 9/00 210/636 |
| 2015/0101987 A1 * | 4/2015 | Yeh | C02F 1/001 210/287 |
| 2016/0030862 A1 * | 2/2016 | Wang | C02F 1/001 210/321.6 |
| 2018/0065090 A1 * | 3/2018 | Christou | B01D 63/02 |
| 2020/0038809 A1 * | 2/2020 | Zhang | C02F 1/001 |

\* cited by examiner

REVERSE OSMOSIS FILTER SYSTEM

REFERENCE TO RELATED APPLICATION

This application claims the benefit of U.S. Provisional Patent Application No. 63/122,123 filed on Dec. 3, 2020, the contents of which are incorporated herein by reference in their entirety.

FIELD OF THE TECHNOLOGY

The present technology relates generally to reverse osmosis (RO) filters, and more particularly, to RO filter systems.

BACKGROUND

Reverse osmosis (RO) is a fluid purification process that uses a partially permeable membrane to remove various impurities (e.g., unwanted ions, molecules, particles and/or particulates, etc.) from a fluid. A reverse osmosis process can remove many types of unwanted dissolved and suspended impurities from a fluid and is used in both industrial and residential applications. In a conventional RO filter, fluid solute is retained on a pressurized side of the RO filter and the pure fluid is allowed to pass to the other side of the RO filter. That is, conventional RO filters allow smaller components of a fluid or solution to pass freely through the RO filter but does not allow larger molecules or ions to pass through the RO filter, which results in a fluid or solution including the desired level of filtration.

At times, conventional RO filters clog earlier than they otherwise should because the fluid or solution includes large amounts of impurities and/or one or more impurities having a large size. As such, conventional RO filters can be inefficient in filtering a fluid and/or not last as long as they should last, both of which are undesirable.

SUMMARY

The various embodiments disclosed herein each define a reverse osmosis (RO) filter system. The RO filter systems disclosed herein can be utilized to filter a fluid or solution more efficiently and/or last longer than conventional RO filters. In various embodiments, the RO filter systems disclosed herein can include one or more RO filters coupled to and in fluid communication with an end cap filter component and/or a fluid turbine component.

In certain embodiments, the RO filter system includes a filter housing, an end cap filter component, and a mounting component. In some embodiments, the filter housing is coupled to and in fluid communication with the end cap filter component and the end cap filter component is coupled to and in fluid communication with the mounting component. Further, the filter housing houses a pre-filter component, a filter component, and a reverse osmosis filter. Here, the pre-filter component is coupled to and in fluid communication with the filter component, the filter component is coupled to and in fluid communication with the RO filter, and the RO filter is coupled to and in fluid communication with the end cap filter component.

In other embodiments, the RO filter system includes a filter housing and a mounting component coupled to and in fluid communication with one another. The filter housing houses a pre-filter component, a filter component, a fluid turbine component, and a reverse osmosis filter. Here, the pre-filter component is coupled to and in fluid communication with the filter component, the filter component is coupled to and in fluid communication with the fluid turbine component, the fluid turbine component is coupled to and in fluid communication with the RO filter, and the RO filter is coupled to and in fluid communication with the mounting component.

In still other embodiments, the RO filter system includes a filter housing, an end cap filter component, and a mounting component. In some embodiments, the filter housing is coupled to and in fluid communication with the end cap filter component and the end cap filter component is coupled to and in fluid communication with the mounting component. Further, the filter housing houses a pre-filter component, a filter component, a fluid turbine component, and a reverse osmosis filter. Here, the pre-filter component is coupled to and in fluid communication with the filter component, the filter component is coupled to and in fluid communication with the fluid turbine component, the fluid turbine component is coupled to and in fluid communication with the RO filter, and the RO filter is coupled to and in fluid communication with the end cap filter component.

BRIEF DESCRIPTION OF THE DRAWINGS

To readily understand the advantages and benefits of the technology, a more particular description of the technology briefly described above will be rendered by reference to specific embodiments that are illustrated in the appended drawings. Understanding that these drawings depict typical embodiments of the technology, and are therefore not to be considered to be limiting of its scope, the technology will be described and explained with additional specificity and detail through the use of the accompanying drawings, in which.

DETAILED DESCRIPTION OF THE DRAWINGS

It should be understood that the language used in the present disclosure has been principally selected for readability and instructional purposes, and not to limit the scope of the subject matter disclosed herein in any manner. Further, reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including, but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology includes reverse osmosis filter systems that can include an end cap filter and/or a fluid turbine component. Further, the described features, structures, or characteristics of the various embodiments disclosed herein may be combined in any suitable manner. One skilled in the relevant art will recognize, however, that embodiments may be practiced without one or more of the specific details, or with other methods, components, materials, and so forth. In other instances, well-known structures, and/or materials are not shown or described in detail to avoid obscuring aspects of an embodiment.

Figure 1A:
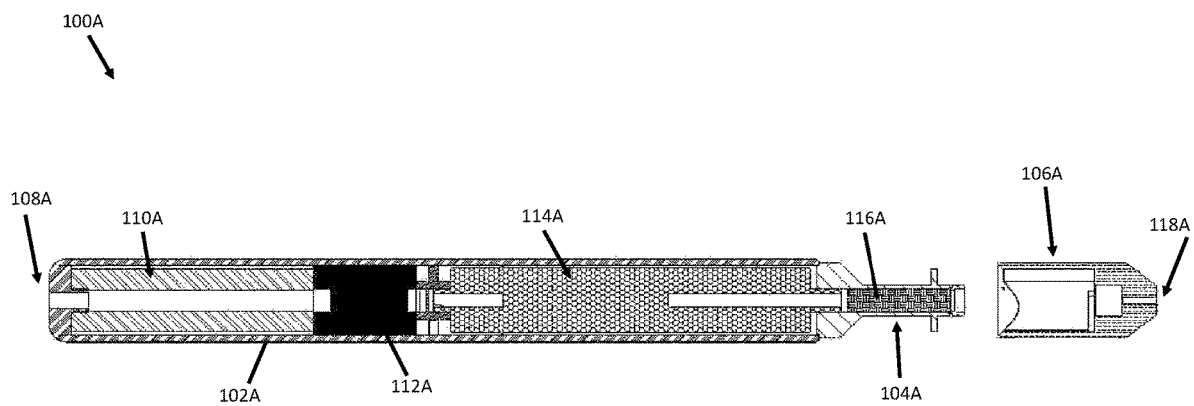
FIG. 1A is a diagram illustrating one embodiment of a reverse osmosis (RO) filter system.

Turning now to the drawings, FIG. 1A is a diagram illustrating one embodiment of a reverse osmosis (RO) filter system 100A. At least in the illustrated embodiment, the RO filter system 100A includes, among other components, a filter housing 102A, an end cap filter component 104A, and a mounting component 106A. As illustrated in FIG. 1A, the filter housing 102A is coupled to and/or in fluid communication with the end cap filter component 104A and the end cap filter component 104A is coupled to and/or in fluid communication with the mounting component 106A.

The filter housing 102A may include and/or be formed of any suitable material that is known or developed in the future. In various embodiments, the filter housing 102A includes and/or is formed of Poly Vinyl Chloride (PVC) and/or Acrylonitrile Butadiene Styrene (ABS), among other materials that are possible and contemplated herein.

The filter housing 102A may include any suitable shape that can enable/allow a flow of fluid to pass therethrough for filtration. In some embodiments, the filter housing 102A includes a generally circular and/or generally tubular shape, among other shapes that are possible and contemplated herein.

The filter housing 102A may include any suitable size dimensions that can enable/allow a flow of fluid to pass therethrough for filtration. In various embodiments, the filter housing includes a diameter in the range of about one (1) inch to about six (6) inches, among other range sizes and/or diameter sizes that are possible and contemplated herein. In some embodiments, the filter housing 102A includes a diameter of about two (2) inches, among other diameters that are greater than or less than 2 inches that are possible and contemplated herein. In other embodiments, the filter housing 102A includes a diameter of about three (3) inches, among other diameters that are greater than or less than 3 inches that are possible and contemplated herein.

In various embodiments, the filter housing 102A is hollow and is configured and/or includes dimensions suitable for housing a set of filtration components, as discussed elsewhere herein. Further, the filter housing 102A configured and/or includes any suitable length dimension capable of housing the set of filtration components, as discussed elsewhere herein.

At least in the illustrated embodiment, the filter housing 102A includes a fluid inlet 108A is configured to house and/or houses, among other components, a pre-filter component 110A, a filter component 112A, and an RO filter 114A.

In some embodiments, the fluid inlet 108A is configured to detachable couple to and/or includes a coupling device to detachably couple to a fluid source to enable the RO filter system 100A to receive a pressurized flow of fluid to enter into the filter housing 102A and/or the RO filter system 100A (e.g., to become in fluid communication with the fluid source). The coupling device may include any suitable mechanism that can enable/allow the fluid inlet 108A to detachably couple to the fluid source and/or become detachably in fluid communication with the fluid source.

In various embodiments, the fluid inlet 108A includes a size and/or a shape to allow/enable a pressurized flow of fluid to enter into the filter housing 102A and/or the RO filter system 100A, which can be a suitable amount of pressure and/or amount of pound-force per square inch ($lbf/in^2$) or pounds per square inch (psi). In various embodiments, the amount of pressure is in the range of about eighty (80) psi to about one hundred twenty (120) psi, among other range sizes and/or amounts of pressure that are greater than 120 psi or less than 80 psi that are possible and contemplated herein.

In various embodiments, the fluid inlet 108A includes and/or forms an aperture (or hole) that allows a fluid to enter into the filter housing 102A and/or the RO filter system 100A. The fluid inlet 108A may include any suitable size and/or shape that can allow/enable a flow of fluid to enter the filter housing 102A and/or the RO filter system 100A. Upon entering the filter housing 102A and/or the RO filter system 100A via the fluid inlet 108A, the fluid is directed to the pre-filter component 110A.

The pre-filter component 110A may include and/or be formed of any suitable material(s) that is/are capable of filtering (e.g., pre-filtering) a fluid, liquid, and/or solution, and may be referred to herein as a pre-filtering material. Some non-limiting examples of a suitable material include, but are not limited to, a carbon material (e.g., charcoal, solid carbon, etc.) and/or a fibrous material, among other suitable materials that are porous and/or permeable to a fluid, a liquid, and/or a solution. In certain embodiments, the pre-filter component 110A includes and/or is formed of a cotton material or a cotton-blend material, among other fibrous materials that are possible and contemplated herein.

The material(s) included in the pre-filter component 110A, in various embodiments, are configured to pre-filter larger and/or relatively large elements from the flow of fluid that has entered the pre-filter component 110A. The pre-filter component 110A is configured to pre-filter (e.g., filter) any element that includes a size greater than or equal a predetermined size.

In various embodiments, the predetermined size that can be filtered out by the pre-filter component 110A is a size greater than in the range of about 1.0 microns to about 2.0 microns. In certain embodiments, the pre-filter component 110A can filter out elements having a size greater than or equal to about 1.0 microns.

The pre-filter component 110A may include any suitable dimensions (e.g., length and diameter, etc.) that allows the pre-filter component 110A to be housed within the filter housing 102A. That is, the pre-filter component 110A includes a length that is smaller than the length of the filter housing 102A.

Various embodiments provide that the pre-filter component 110A includes a diameter that is smaller than the diameter of the filter housing 102A. In some embodiments, the smaller diameter of the pre-filter component 110A creates/forms a gap or space between the pre-filter component 110A and the filter housing 102A, as discussed in greater detail elsewhere herein.

The pre-filter component 110A can include any suitable shape and may include the same shape as the filter housing 102A; however, different shapes are possible and contemplated herein. In various embodiments, the pre-filter component 110A includes a generally circular and/or generally tubular shape. In certain embodiments, the generally circular and/or generally tubular shape of the pre-filter component 110A is hollow to enable the flow of fluid to enter therein from the fluid inlet 108A.

In various embodiments, the hollow portion of the pre-filter component 110A is configured to allow the fluid to enter the pre-filter component 110A and to direct the flow of fluid to flow outwardly through the pre-filter component 110A. That is, the flow of fluid flows in-to-out in the pre-filter component 110A. Specifically, the flow of fluid is directed to flow from the inner hollow portion of the pre-filter component 110A outwardly through the pre-filtering material (e.g., a carbon, cotton and/or cotton-blend material, etc.) to the gap or space that exists between the pre-filter component 110A and the filter housing 102A. Upon reaching the gap or space that exists between the pre-filter component 110A and the filter housing 102A, the flow of fluid is directed to the filter component 112A.

The filter component 112A may include and/or be formed of any suitable material(s) that is/are capable of filtering a fluid, liquid, and/or solution, and may be referred to herein as a filtering material. In various embodiments, the filter component 112A includes and/or is formed of one or more carbon materials, among other materials that are porous and/or permeable to a fluid, a liquid, and/or a solution that are possible and contemplated herein. In certain embodiments, the filter component 112A includes and/or is formed of charcoal and/or solid carbon, among other materials that are possible and contemplated herein.

The material(s) included in the filter component 112A may be selected to filter out one or more particular elements from the flow of fluid, which can include any undesirable element(s) in the flow of fluid. In certain embodiments, the material(s) included in the filter component 112A are configured to filter out chlorine, bromine, and/or the like elements, among other elements that are possible and contemplated herein.

The filter component 112A may include any suitable dimensions (e.g., length and diameter, etc.) that allows the pre-filter component 112A to be housed within the filter housing 102A. That is, the pre-filter component 112A includes a length that is smaller than the length of the filter housing 102A.

After passing through the filter component 112A, the filtered flow of fluid is directed to the RO filter 114A. That is, the filter component 112A is configured to direct the filtered flow of fluid to the RO filter 114A after the fluid has been pre-filtered by the pre-filter component 110A and the one or more undesirable elements (e.g., chlorine, bromine, etc.) have been filtered/removed by the filter component 112A.

The RO filter 114A may include RO filter that is known or developed in the future capable of performing a reverse osmosis process on a flow of fluid received from the filter component 112A. That is, the RO filter 114A may include and/or be formed of any suitable material(s) capable of performing a reverse osmosis process on a flow of fluid.

Further, the RO filter 114A may include any suitable dimensions (e.g., length and diameter, etc.) that allows the RO filter 114A to be housed within the filter housing 102A. That is, the RO filter 114A includes a length that is smaller than the length of the filter housing 102A.

In some embodiments, the RO filter 114A is the last stage of a filter process performed within the filter housing 102A before the flow of fluid is introduced to the end cap filter component 104A. In various embodiments, the filter housing 102A proximate to the RO filter 114A is configured to couple to and/or be in fluid communication with the end cap filter component 104A so that the fluid filtered via an RO process performed by the RO filter 114A can be provided to the end cap filter component 104A.

The end cap filter component 104A may include any suitable shape and/or dimensions that can facilitate further filtering the fluid in the flow of fluid after the fluid is filtered by the RO filter 114A. Further, the end cap filter component 104A may include and/or be formed of any suitable material(s) that is/are capable of facilitating the filtration of a fluid, liquid, and/or solution.

In various embodiments, the end cap filter component 104A includes and/or houses one or more filter components 116A. The filter component(s) 116A may include and/or be formed of any suitable material(s) that is/are capable of further filtering a fluid, liquid, and/or solution, and may be referred to herein as a further filtering material. In various embodiments, the filter component(s) 116A may include one or more carbon materials, among other materials that are porous and/or permeable to a fluid, a liquid, and/or a solution that are possible and contemplated herein. In certain embodiments, the filter component(s) 116A include and/or are formed of charcoal and/or solid carbon, among other materials that are possible and contemplated herein.

In various embodiments, the filter component(s) 116A is/are configured to filter any element that includes a size greater than or equal a predetermined size. The filter component(s) 116A included in the end cap filter component 104A, in various embodiments, are configured to filter smaller and/or relatively small elements from the flow of fluid that has entered the end cap filter component 104A and already been filtered by the pre-filter component 110A, the filter component 112A, and the RO filter 114A.

In various embodiments, the predetermined size of element that can be filtered out by the filter component(s) 116A and/or the end cap filter component 104A is any element having a size greater than a size in the range of about 0.5 microns to about 5 microns. In certain embodiments, the filter component(s) 116A and/or the end cap filter component 104A can filter out elements having a size greater than or equal to about 0.5 microns.

In certain embodiments, the end cap filter component 104A is the last stage of a filter process performed by the RO filter system 100A before the filtered flow of fluid is provided to an external target destination. The end cap filter component 104A is further discussed below with reference to FIGS. 2A-2C. In various embodiments, the end cap filter component 104A is configured to couple to and/or be in fluid communication with the mounting component 106A so that the fluid filtered by the RO filter system 100A can be provided to the external target destination via the mounting component 106A.

The mounting component 106A may include any suitable size and/or shape that can enable/allow a flow of fluid to pass therethrough after filtration. In some embodiments, the mounting component 106A includes a generally circular and/or generally tubular shape, among other shapes that are possible and contemplated herein.

At least in the illustrated embodiment, the mounting component 106A includes and/or forms a fluid outlet 118A. In some embodiments, the fluid outlet 118A is configured to detachable couple to and/or includes a coupling device to detachably couple to a fluid target and/or destination to enable the RO filter system 100A to provide a filtered flow of fluid to enter to the fluid target and/or destination (e.g., to become in fluid communication with the fluid target and/or destination). The coupling device may include any suitable mechanism that can enable/allow the fluid outlet 118A to detachably couple to the fluid target/destination and/or become detachably in fluid communication with the fluid target and/or destination. In various embodiments, the fluid outlet 118A includes a size and/or a shape to allow/enable a filtered flow of fluid to reach the fluid target/destination.

In various embodiments, the fluid outlet 108A includes and/or forms an aperture (or hole) that allows a fluid to exit the RO filter system 100A. The aperture may include any suitable size and/or shape that can allow/enable a flow of fluid to exit the RO filter system 100A.

Figure 1B:
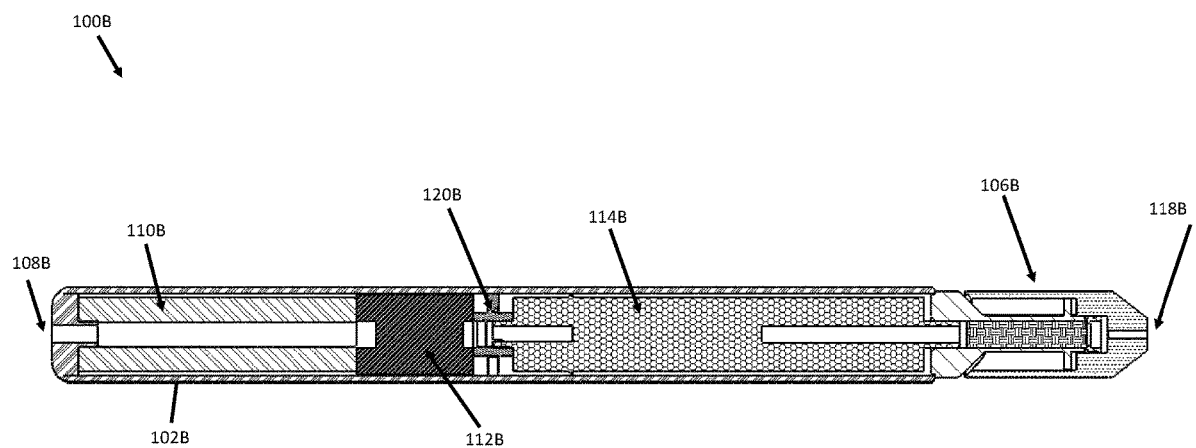
FIG. 1B is a diagram illustrating another embodiment of an RO filter system.

Referring to FIG. 1B, FIG. 1B is a diagram illustrating another embodiment of an RO filter system 100B. At least in the illustrated embodiment, the RO filter system 100B includes, among other components, a filter housing 102B and a mounting component 106B. As illustrated in FIG. 1B, the filter housing 102B is coupled to and/or in fluid communication with the mounting component 106B.

The filter housing 102B may include and/or be formed of any suitable material that is known or developed in the future. In various embodiments, the filter housing 102B includes and/or is formed of PVC and/or ABS, among other materials that are possible and contemplated herein.

The filter housing 102B may include any suitable shape that can enable/allow a flow of fluid to pass therethrough for filtration. In some embodiments, the filter housing 102B includes a generally circular and/or generally tubular shape, among other shapes that are possible and contemplated herein.

The filter housing 102B may include any suitable size dimensions that can enable/allow a flow of fluid to pass therethrough for filtration. In various embodiments, the filter housing includes a diameter in the range of about 1 inch to about 6 inches, among other range sizes and/or diameter sizes that are possible and contemplated herein. In some embodiments, the filter housing 102B includes a diameter of about 2 inches, among other diameters that are greater than or less than 2 inches that are possible and contemplated herein. In other embodiments, the filter housing 102B includes a diameter of about 3 inches, among other diameters that are greater than or less than 3 inches that are possible and contemplated herein.

In various embodiments, the filter housing 102B is hollow and is configured and/or includes dimensions suitable for housing a set of filtration components, as discussed elsewhere herein. Further, the filter housing 102B configured and/or includes any suitable length dimension capable of housing the set of filtration components, as discussed elsewhere herein.

At least in the illustrated embodiment, the filter housing 102B includes a fluid inlet 108B is configured to house and/or houses, among other components, a pre-filter component 110B, a filter component 112B, a fluid turbine component 120B, and an RO filter 114B.

In some embodiments, the fluid inlet 108B is configured to detachable couple to and/or includes a coupling device to detachably couple to a fluid source to enable the RO filter system 100B to receive a pressurized flow of fluid to enter into the filter housing 102B and/or the RO filter system 100B (e.g., to become in fluid communication with the fluid source). The coupling device may include any suitable mechanism that can enable/allow the fluid inlet 108B to detachably couple to the fluid source and/or become detachably in fluid communication with the fluid source.

In various embodiments, the fluid inlet 108B includes a size and/or a shape to allow/enable a pressurized flow of fluid to enter into the filter housing 102B and/or the RO filter system 100B, which can be a suitable amount of pressure and/or amount of pound-force per square inch ($lbf/in^2$) or pounds per square inch (psi). In various embodiments, the amount of pressure is in the range of about 80 psi to about 120 psi, among other range sizes and/or amounts of pressure that are greater than 120 psi or less than 80 psi that are possible and contemplated herein.

In various embodiments, the fluid inlet 108B includes and/or forms an aperture (or hole) that allows a fluid to enter into the filter housing 102B and/or the RO filter system 100B. The fluid inlet 108B may include any suitable size and/or shape that can allow/enable a flow of fluid to enter the filter housing 102B and/or the RO filter system 100B. Upon entering the filter housing 102B and/or the RO filter system 100B via the fluid inlet 108B, the fluid is directed to the pre-filter component 110B.

The pre-filter component 110B may include and/or be formed of any suitable material(s) that is/are capable of filtering (e.g., pre-filtering) a fluid, liquid, and/or solution, and may be referred to herein as a pre-filtering material. Some non-limiting examples of a suitable material include, but are not limited to, a carbon material (e.g., charcoal, solid carbon, etc.) and/or a fibrous material, among other suitable materials that are porous and/or permeable to a fluid, a liquid, and/or a solution. In certain embodiments, the pre-filter component 110B includes and/or is formed of a cotton material or a cotton-blend material, among other fibrous materials that are possible and contemplated herein.

The material(s) included in the pre-filter component 110B, in various embodiments, are configured to pre-filter larger and/or relatively large elements from the flow of fluid that has entered the pre-filter component 110B. The pre-filter component 110B is configured to pre-filter (e.g., filter) any element that includes a size greater than or equal a predetermined size.

In various embodiments, the predetermined size that can be filtered out by the pre-filter component 110B is a size greater than in the range of about 1.0 microns to about 2.0 microns. In certain embodiments, the pre-filter component 110B can filter out elements having a size greater than or equal to about 1.0 microns.

The pre-filter component 110B may include any suitable dimensions (e.g., length and diameter, etc.) that allows the pre-filter component 110B to be housed within the filter housing 102B. That is, the pre-filter component 110B includes a length that is smaller than the length of the filter housing 102B.

Various embodiments provide that the pre-filter component 110B includes a diameter that is smaller than the diameter of the filter housing 102B. In some embodiments, the smaller diameter of the pre-filter component 110B creates/forms a gap or space between the pre-filter component 110B and the filter housing 102B, as discussed in greater detail elsewhere herein.

The pre-filter component 110B can include any suitable shape and may include the same shape as the filter housing 102B; however, different shapes are possible and contemplated herein. In various embodiments, the pre-filter component 110B includes a generally circular and/or generally tubular shape. In certain embodiments, the generally circular and/or generally tubular shape of the pre-filter component 110B is hollow to enable the flow of fluid to enter therein from the fluid inlet 108B.

In various embodiments, the hollow portion of the pre-filter component 110B is configured to allow the fluid to enter the pre-filter component 110B and to direct the flow of fluid to flow outwardly through the pre-filter component 110B. That is, the flow of fluid flows in-to-out in the pre-filter component 110B. Specifically, the flow of fluid is directed to flow from the inner hollow portion of the pre-filter component 110B outwardly through the pre-filtering material (e.g., a carbon, cotton and/or cotton-blend material, etc.) to the gap or space that exists between the pre-filter component 110B and the filter housing 102B. Upon reaching the gap or space that exists between the pre-filter component 110B and the filter housing 102B, the flow of fluid is directed to the filter component 112B.

The filter component 112B may include and/or be formed of any suitable material(s) that is/are capable of filtering a fluid, liquid, and/or solution, and may be referred to herein as a filtering material. In various embodiments, the filter component 112B includes and/or is formed of one or more carbon materials, among other materials that are porous and/or permeable to a fluid, a liquid, and/or a solution that are possible and contemplated herein. In certain embodiments, the filter component 112B includes and/or is formed of charcoal and/or solid carbon, among other materials that are possible and contemplated herein.

The material(s) included in the filter component 112B may be selected to filter out one or more particular elements from the flow of fluid, which can include any undesirable element(s) in the flow of fluid. In certain embodiments, the material(s) included in the filter component 112B are configured to filter out chlorine, bromine, and/or the like elements, among other elements that are possible and contemplated herein.

The filter component 112B may include any suitable dimensions (e.g., length and diameter, etc.) that allows the pre-filter component 112B to be housed within the filter housing 102A. That is, the pre-filter component 112B includes a length that is smaller than the length of the filter housing 102B.

After passing through the filter component 112B, the filtered flow of fluid is directed to the fluid turbine component 120B. The fluid turbine component 120B is configured to assist and/or control the flow of the liquid to the RO filter 114B.

The fluid turbine component 120B may include and/or be formed of any suitable material that is known or developed in the future. In various embodiments, the fluid turbine component 120B includes and/or is formed of a plastic, a metal, an alloy, a composite, and/or a graphite material, etc., among other materials that are possible and contemplated herein. In certain embodiments, the fluid turbine component 120B includes and/or is formed of a plastic material. The fluid turbine component 120B is further discussed below with reference to FIGS. 3A-3C.

The fluid turbine component 120B is configured to control the flow of filtered fluid to the RO filter 114B. That is, the fluid turbine component 120B is configured to direct the flow of filtered fluid to the RO filter 114B after the fluid has been pre-filtered by the pre-filter component 110A and the one or more undesirable elements (e.g., chlorine, bromine, etc.) have been filtered/removed by the filter component 112B.

The RO filter 114B may include RO filter that is known or developed in the future capable of performing a reverse osmosis process on a flow of fluid received from the filter component 112B. That is, the RO filter 114B may include and/or be formed of any suitable material(s) capable of performing a reverse osmosis process on a flow of fluid.

Further, the RO filter 114B may include any suitable dimensions (e.g., length and diameter, etc.) that allows the RO filter 114B to be housed within the filter housing 102B. That is, the RO filter 114B includes a length that is smaller than the length of the filter housing 102A.

In some embodiments, the RO filter 114B is the last stage of a filter process performed within the filter housing 102B before the flow of fluid is introduced to the mounting component 106B. In various embodiments, the filter housing 102B proximate to the RO filter 114B is configured to couple to and/or be in fluid communication with the mounting component 106B so that the fluid filtered via an RO process performed by the RO filter 114B can be provided to the mounting component 106B.

The mounting component 106B may include any suitable size and/or shape that can enable/allow a flow of fluid to pass therethrough after filtration. In some embodiments, the mounting component 106B includes a generally circular and/or generally tubular shape, among other shapes that are possible and contemplated herein.

At least in the illustrated embodiment, the mounting component 106B includes and/or forms a fluid outlet 118B. In some embodiments, the fluid outlet 118B is configured to detachable couple to and/or includes a coupling device to detachably couple to a fluid target and/or destination to enable the RO filter system 100B to provide a filtered flow of fluid to enter to the fluid target and/or destination (e.g., to become in fluid communication with the fluid target and/or destination). The coupling device may include any suitable mechanism that can enable/allow the fluid outlet 118B to detachably couple to the fluid target/destination and/or become detachably in fluid communication with the fluid target and/or destination. In various embodiments, the fluid outlet 118B includes a size and/or a shape to allow/enable a filtered flow of fluid to reach the fluid target/destination.

In various embodiments, the fluid outlet 108B includes and/or forms an aperture (or hole) that allows a fluid to exit the RO filter system 100B. The aperture may include any suitable size and/or shape that can allow/enable a flow of fluid to exit the RO filter system 100B.

Figure 1C:
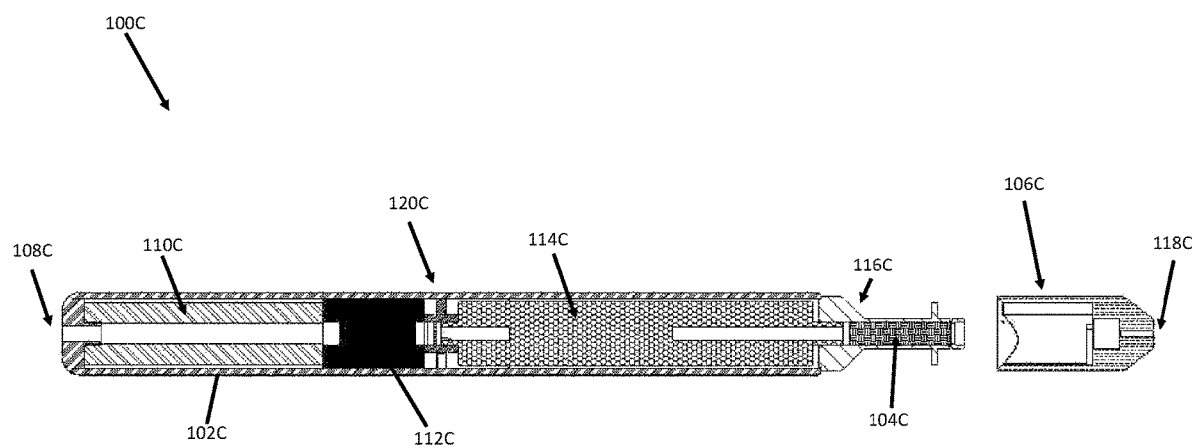
FIG. 1C is a diagram illustrating yet another embodiment of an RO filter system.

With reference now to FIG. 1C, FIG. 1C is a diagram illustrating yet another embodiment of an RO filter system 100C. At least in the illustrated embodiment, the RO filter system 100C includes, among other components, a filter housing 102C, an end cap filter component 104C, and a mounting component 106C. As illustrated in FIG. 1C, the filter housing 102C is coupled to and/or in fluid communication with the end cap filter component 104C and the end cap filter component 104C is coupled to and/or in fluid communication with the mounting component 106C.

The filter housing 102C may include and/or be formed of any suitable material that is known or developed in the future. In various embodiments, the filter housing 102C includes and/or is formed of PVC and/or ABS, among other materials that are possible and contemplated herein.

The filter housing 102C may include any suitable shape that can enable/allow a flow of fluid to pass therethrough for filtration. In some embodiments, the filter housing 102C includes a generally circular and/or generally tubular shape, among other shapes that are possible and contemplated herein.

The filter housing 102C may include any suitable size dimensions that can enable/allow a flow of fluid to pass therethrough for filtration. In various embodiments, the filter housing includes a diameter in the range of about 1 inch to about 6 inches, among other range sizes and/or diameter sizes that are possible and contemplated herein. In some embodiments, the filter housing 102C includes a diameter of about 2 inches, among other diameters that are greater than or less than 2 inches that are possible and contemplated herein. In other embodiments, the filter housing 102C includes a diameter of about 3 inches, among other diameters that are greater than or less than 3 inches that are possible and contemplated herein.

In various embodiments, the filter housing 102C is hollow and is configured and/or includes dimensions suitable for housing a set of filtration components, as discussed elsewhere herein. Further, the filter housing 102C configured and/or includes any suitable length dimension capable of housing the set of filtration components, as discussed elsewhere herein.

At least in the illustrated embodiment, the filter housing 102C includes a fluid inlet 108C is configured to house and/or houses, among other components, a pre-filter component 110C, a filter component 112C, a fluid turbine component 120C, and an RO filter 114C.

In some embodiments, the fluid inlet 108C is configured to detachable couple to and/or includes a coupling device to detachably couple to a fluid source to enable the RO filter system 100C to receive a pressurized flow of fluid to enter into the filter housing 102C and/or the RO filter system 100C (e.g., to become in fluid communication with the fluid source). The coupling device may include any suitable mechanism that can enable/allow the fluid inlet 108C to detachably couple to the fluid source and/or become detachably in fluid communication with the fluid source.

In various embodiments, the fluid inlet 108C includes a size and/or a shape to allow/enable a pressurized flow of fluid to enter into the filter housing 102C and/or the RO filter system 100C, which can be a suitable amount of pressure and/or amount of pound-force per square inch (lbf/in$^2$) or pounds per square inch (psi). In various embodiments, the amount of pressure is in the range of about 80 psi to about 120 psi, among other range sizes and/or amounts of pressure that are greater than 120 psi or less than 80 psi that are possible and contemplated herein.

In various embodiments, the fluid inlet 108C includes and/or forms an aperture (or hole) that allows a fluid to enter into the filter housing 102C and/or the RO filter system 100C. The fluid inlet 108C may include any suitable size and/or shape that can allow/enable a flow of fluid to enter the filter housing 102C and/or the RO filter system 100C. Upon entering the filter housing 102C and/or the RO filter system 100C via the fluid inlet 108C, the fluid is directed to the pre-filter component 110C.

The pre-filter component 110C may include and/or be formed of any suitable material(s) that is/are capable of filtering (e.g., pre-filtering) a fluid, liquid, and/or solution, and may be referred to herein as a pre-filtering material. Some non-limiting examples of a suitable material include, but are not limited to, a carbon material (e.g., charcoal, solid carbon, etc.) and/or a fibrous material, among other suitable materials that are porous and/or permeable to a fluid, a liquid, and/or a solution. In certain embodiments, the pre-filter component 110C includes and/or is formed of a cotton material or a cotton-blend material, among other fibrous materials that are possible and contemplated herein.

The material(s) included in the pre-filter component 110C, in various embodiments, are configured to pre-filter larger and/or relatively large elements from the flow of fluid that has entered the pre-filter component 110C. The pre-filter component 110C is configured to pre-filter (e.g., filter) any element that includes a size greater than or equal a predetermined size.

In various embodiments, the predetermined size that can be filtered out by the pre-filter component 110C is a size greater than in the range of about 1.0 microns to about 2.0 microns. In certain embodiments, the pre-filter component 110C can filter out elements having a size greater than or equal to about 1.0 microns.

The pre-filter component 110C may include any suitable dimensions (e.g., length and diameter, etc.) that allows the pre-filter component 110C to be housed within the filter housing 102B. That is, the pre-filter component 110C includes a length that is smaller than the length of the filter housing 102C.

Various embodiments provide that the pre-filter component 110C includes a diameter that is smaller than the diameter of the filter housing 102C. In some embodiments, the smaller diameter of the pre-filter component 110C creates/forms a gap or space between the pre-filter component 110C and the filter housing 102C, as discussed in greater detail elsewhere herein.

The pre-filter component 110C can include any suitable shape and may include the same shape as the filter housing 102C; however, different shapes are possible and contemplated herein. In various embodiments, the pre-filter component 110C includes a generally circular and/or generally tubular shape. In certain embodiments, the generally circular and/or generally tubular shape of the pre-filter component 110C is hollow to enable the flow of fluid to enter therein from the fluid inlet 108C.

In various embodiments, the hollow portion of the pre-filter component 110C is configured to allow the fluid to enter the pre-filter component 110C and to direct the flow of fluid to flow outwardly through the pre-filter component 110C. That is, the flow of fluid flows in-to-out in the pre-filter component 110C. Specifically, the flow of fluid is directed to flow from the inner hollow portion of the pre-filter component 110C outwardly through the pre-filtering material (e.g., a carbon, cotton and/or cotton-blend material, etc.) to the gap or space that exists between the pre-filter component 110C and the filter housing 102C. Upon reaching the gap or space that exists between the pre-filter component 110C and the filter housing 102C, the flow of fluid is directed to the filter component 112C.

The filter component 112C may include and/or be formed of any suitable material(s) that is/are capable of filtering a fluid, liquid, and/or solution, and may be referred to herein as a filtering material. In various embodiments, the filter component 112C includes and/or is formed of one or more carbon materials, among other materials that are porous and/or permeable to a fluid, a liquid, and/or a solution that are possible and contemplated herein. In certain embodiments, the filter component 112C includes and/or is formed of charcoal and/or solid carbon, among other materials that are possible and contemplated herein.

The material(s) included in the filter component 112C may be selected to filter out one or more particular elements from the flow of fluid, which can include any undesirable element(s) in the flow of fluid. In certain embodiments, the material(s) included in the filter component 112C are configured to filter out chlorine, bromine, and/or the like elements, among other elements that are possible and contemplated herein.

The filter component 112C may include any suitable dimensions (e.g., length and diameter, etc.) that allows the pre-filter component 112C to be housed within the filter housing 102A. That is, the pre-filter component 112C includes a length that is smaller than the length of the filter housing 102C.

After passing through the filter component 112C, the filtered flow of fluid is directed to the fluid turbine component 120C. The fluid turbine component 120C is configured to assist and/or control the flow of the liquid to the RO filter 114C.

The fluid turbine component 120C may include and/or be formed of any suitable material that is known or developed in the future. In various embodiments, the fluid turbine component 120C includes and/or is formed of a plastic, a metal, an alloy, a composite, and/or a graphite material, etc., among other materials that are possible and contemplated herein. In certain embodiments, the fluid turbine component 120C includes and/or is formed of a plastic material. The fluid turbine component 120C is further discussed below with reference to FIGS. 3A-3C.

The fluid turbine component 120C is configured to control the flow of filtered fluid to the RO filter 114C. That is, the fluid turbine component 120C is configured to direct the flow of filtered fluid to the RO filter 114C after the fluid has been pre-filtered by the pre-filter component 110A and the one or more undesirable elements (e.g., chlorine, bromine, etc.) have been filtered/removed by the filter component 112C.

The RO filter 114C may include RO filter that is known or developed in the future capable of performing a reverse osmosis process on a flow of fluid received from the filter component 112C. That is, the RO filter 114C may include and/or be formed of any suitable material(s) capable of performing a reverse osmosis process on a flow of fluid.

Further, the RO filter 114C may include any suitable dimensions (e.g., length and diameter, etc.) that allows the RO filter 114C to be housed within the filter housing 102C. That is, the RO filter 114C includes a length that is smaller than the length of the filter housing 102A.

In some embodiments, the RO filter 114C is the last stage of a filter process performed within the filter housing 102C before the flow of fluid is introduced to the end cap filter component 104C. In various embodiments, the filter housing 102C proximate to the RO filter 114C is configured to couple to and/or be in fluid communication with the end cap filter component 104C so that the fluid filtered via an RO process performed by the RO filter 114C can be provided to the end cap filter component 104C.

The end cap filter component 104C may include any suitable shape and/or dimensions that can facilitate further filtering the fluid in the flow of fluid after the fluid is filtered by the RO filter 114C. Further, the end cap filter component 104C may include and/or be formed of any suitable material(s) that is/are capable of facilitating the filtration of a fluid, liquid, and/or solution.

In various embodiments, the end cap filter component 104C includes and/or houses one or more filter components 116C. The filter component(s) 116C may include and/or be formed of any suitable material(s) that is/are capable of further filtering a fluid, liquid, and/or solution, and may be referred to herein as a further filtering material. In various embodiments, the filter component(s) 116C may include one or more carbon materials, among other materials that are porous and/or permeable to a fluid, a liquid, and/or a solution that are possible and contemplated herein. In certain embodiments, the filter component(s) 116C include and/or are formed of charcoal and/or solid carbon, among other materials that are possible and contemplated herein.

In various embodiments, the filter component(s) 116C is/are configured to filter any element that includes a size greater than or equal a predetermined size. The filter component(s) 116C included in the end cap filter component 104C, in various embodiments, are configured to filter smaller and/or relatively small elements from the flow of fluid that has entered the end cap filter component 104C and already been filtered by the pre-filter component 110C, the filter component 112C, and the RO filter 114C.

In various embodiments, the predetermined size of element that can be filtered out by the filter component(s) 116C and/or the end cap filter component 104C is any element having a size greater than a size in the range of about 0.5 microns to about 5 microns. In certain embodiments, the filter component(s) 116C and/or the end cap filter component 104C can filter out elements having a size greater than or equal to about 0.5 microns.

In certain embodiments, the end cap filter component 104C is the last stage of a filter process performed by the RO filter system 100C before the filtered flow of fluid is provided to an external target destination. The end cap filter component 104C is further discussed below with reference to FIGS. 2A-2C. In various embodiments, the end cap filter component 104C is configured to couple to and/or be in fluid communication with the mounting component 106C so that the fluid filtered by the RO filter system 100C can be provided to the external target destination via the mounting component 106C.

The mounting component 106C may include any suitable size and/or shape that can enable/allow a flow of fluid to pass therethrough after filtration. In some embodiments, the mounting component 106C includes a generally circular and/or generally tubular shape, among other shapes that are possible and contemplated herein.

At least in the illustrated embodiment, the mounting component 106C includes and/or forms a fluid outlet 118C. In some embodiments, the fluid outlet 118C is configured to detachable couple to and/or includes a coupling device to detachably couple to a fluid target and/or destination to enable the RO filter system 100C to provide a filtered flow of fluid to enter to the fluid target and/or destination (e.g., to become in fluid communication with the fluid target and/or destination). The coupling device may include any suitable mechanism that can enable/allow the fluid outlet 118C to detachably couple to the fluid target/destination and/or become detachably in fluid communication with the fluid target and/or destination. In various embodiments, the fluid outlet 118C includes a size and/or a shape to allow/enable a filtered flow of fluid to reach the fluid target/destination.

In various embodiments, the fluid outlet 108C includes and/or forms an aperture (or hole) that allows a fluid to exit the RO filter system 100C. The aperture may include any suitable size and/or shape that can allow/enable a flow of fluid to exit the RO filter system 100C.

The various embodiments of the RO filter systems 100A, 100B, and 100C (also simply referred individually, in various groups, or collectively as RO filter system(s) 100) can include any suitable length. In various embodiments, an RO filter system 100 includes a length in the range of about eighteen (18) inches to about thirty-six (36) inches, among other lengths that are greater than 36 inches or less than 18 inches that are possible and contemplated herein. In certain embodiments, an RO filter system 100 includes a length of about twenty-four (24) inches, among other lengths that are greater than or less than about 24 inches that are possible and contemplated herein.

The various embodiments of the RO filter systems 100A, 100B, and 100C can be configured to filter any suitable fluid, liquid, and/or solution. In some embodiments, the RO filter systems 100A, 100B, and 100C are configured to filter water. In other embodiments, of the RO filter systems 100A, 100B, and 100C may be configured to filter maple sap to produce maple syrup, among other fluids, liquids, and/or solutions that are possible and contemplated herein.

Further, various embodiments of an RO filter system 100 are configured to be disposable. That is, an RO filter system 100 in a particular application may be periodically changed and/or replaced with a new RO filter system 100 (e.g., when the old RO filter system 100 expires, etc.).

Figure 2A:
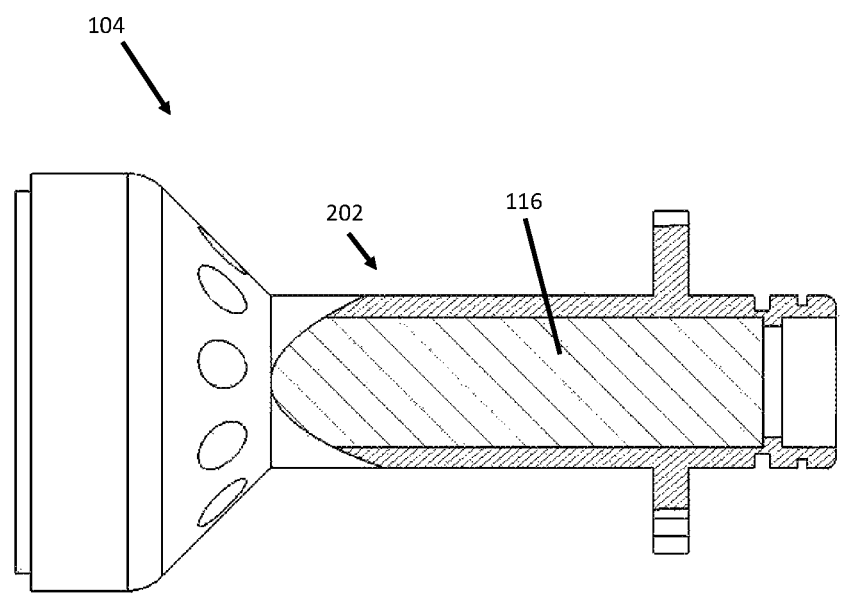
FIGS. 2A-2C are diagrams illustrating various views of one embodiment of an end cap filter included in the RO filter systems illustrated in FIGS. 1 and 3.
Figure 2B:
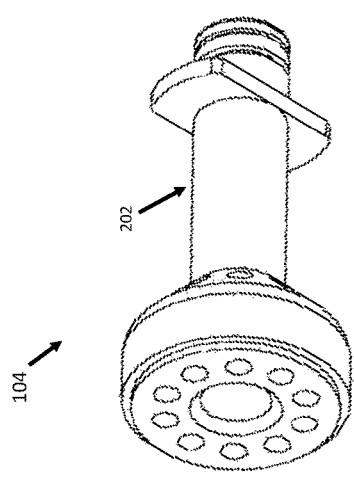
Figure 2C:
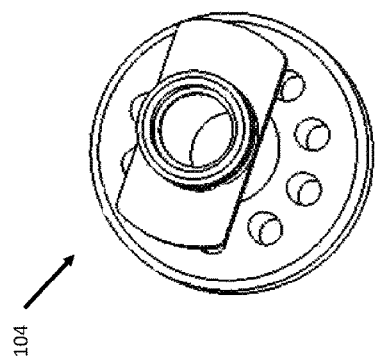

Referring now to FIGS. 2A-2C, FIGS. 2A-2C are diagrams illustrating various views of one embodiment of an end cap filter component 104A and 104C (also simply referred individually, in various groups, or collectively as end cap filter component(s) 104). As shown, the end cap filter component 104 includes and/or houses one or more filter components 116A and 116C (also simply referred individually, in various groups, or collectively as filter component(s) 116), as discussed elsewhere herein. In some embodiments, the one or more filter components 116 filter the flow of fluid and may be considered a polishing block and/or function as a polishing block.

At least in the illustrated embodiment, the end cap filter component 104 further includes an elongated center tube 202 configured to house the filter component(s) 116. The center tube 202 may include any suitable dimensions that can facilitating further filtering a flow of fluid prior to providing the flow of fluid to an external target and/or destination (e.g., via a mounting component 106A, 106B, or 106C). In various embodiments, the center tube 202 includes a length in the range of about 2 inches to about seven (7) inches, among other range sizes and/or sizes that are greater than about 7 inches or less than about 2 inches that are possible and contemplated herein. In certain embodiments, the center tube 202 includes a length of about 4.5 inches, among other sizes that are greater than or less than about 4.5 inches that are possible and contemplated herein.

The center tube 202, in various embodiments, includes a diameter in the range of about 1.5 inches to about 3 inches, among other range sizes and/or sizes that are greater than about 3 inches or less than about 1.5 inches that are possible and contemplated herein. In certain embodiments, the center tube 202 includes a diameter of about 2 inches, among other sizes that are greater than or less than about 2 inches that are possible and contemplated herein.

Figure 3A:
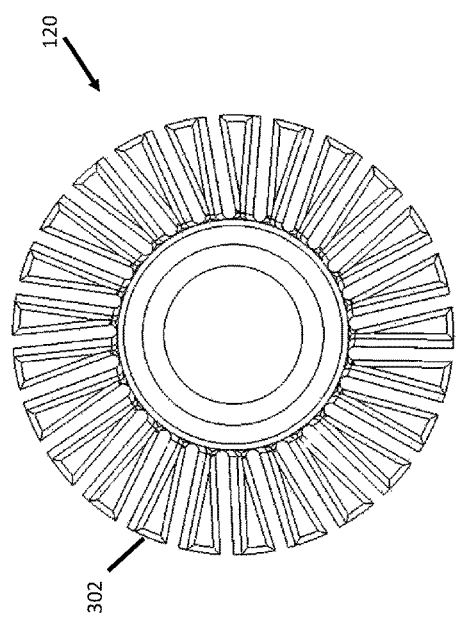
FIGS. 3A-3C are diagrams illustrating various views of one embodiment of a fluid turbine component included in the RO filter systems illustrated in FIGS. 2 and 3.
Figure 3B:
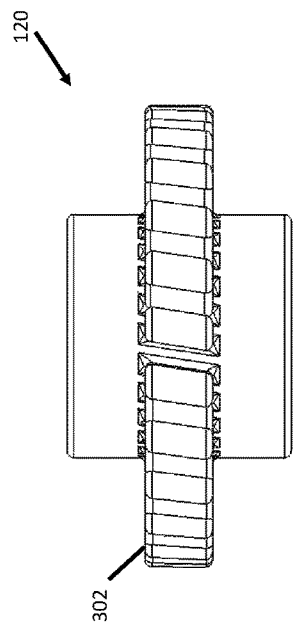
Figure 3C:
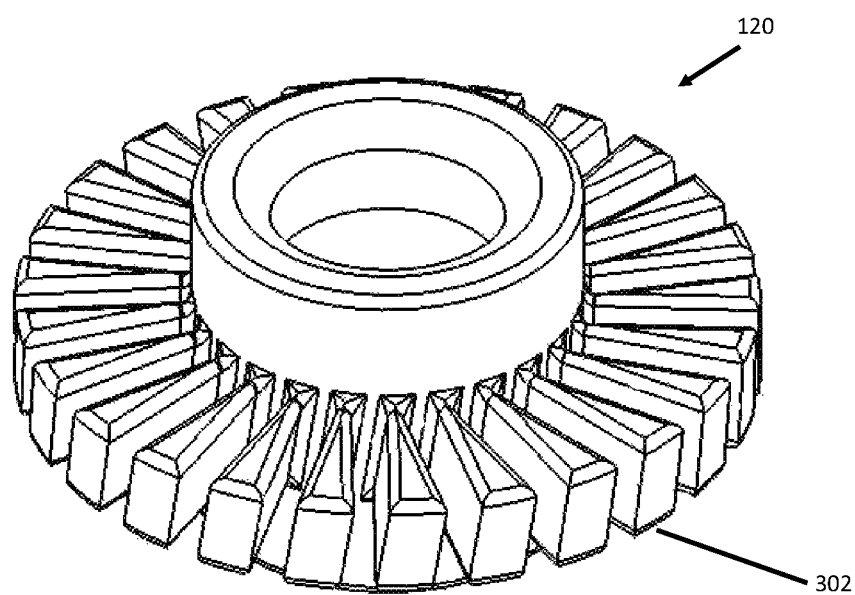

With reference to FIGS. 3A-3C, FIGS. 3A-3C are diagrams illustrating various views of one embodiment of a fluid turbine component 120B and 120C (also simply referred individually, in various groups, or collectively as fluid turbine component(s) 120). As shown, the fluid turbine component 120 includes a plurality of blades 302 arranged in a circular pattern. The fluid turbine component 120 and/or plurality of blades 302 may include and/or be formed of any suitable material, as discussed elsewhere herein.

The blades 302 may include any suitable angle and/or pitch that can facilitate and/or control the flow of fluid to an RO filter (e.g., RO filters 114A, 114B, and 114C). In various embodiments, the blades 302 include an angle and/or pitch in the range of about eighteen degrees (18°) to about thirty-four degrees)(34°), among other sized ranges and/or angles/pitches that are greater than about 34° or less than about 18° that are possible and contemplated herein. In certain embodiments, the blades 302 include an angle and/or pitch of about 22.5°, among angles/pitches that are greater than or less than about 22.5° that are possible and contemplated herein.

Figure 4:
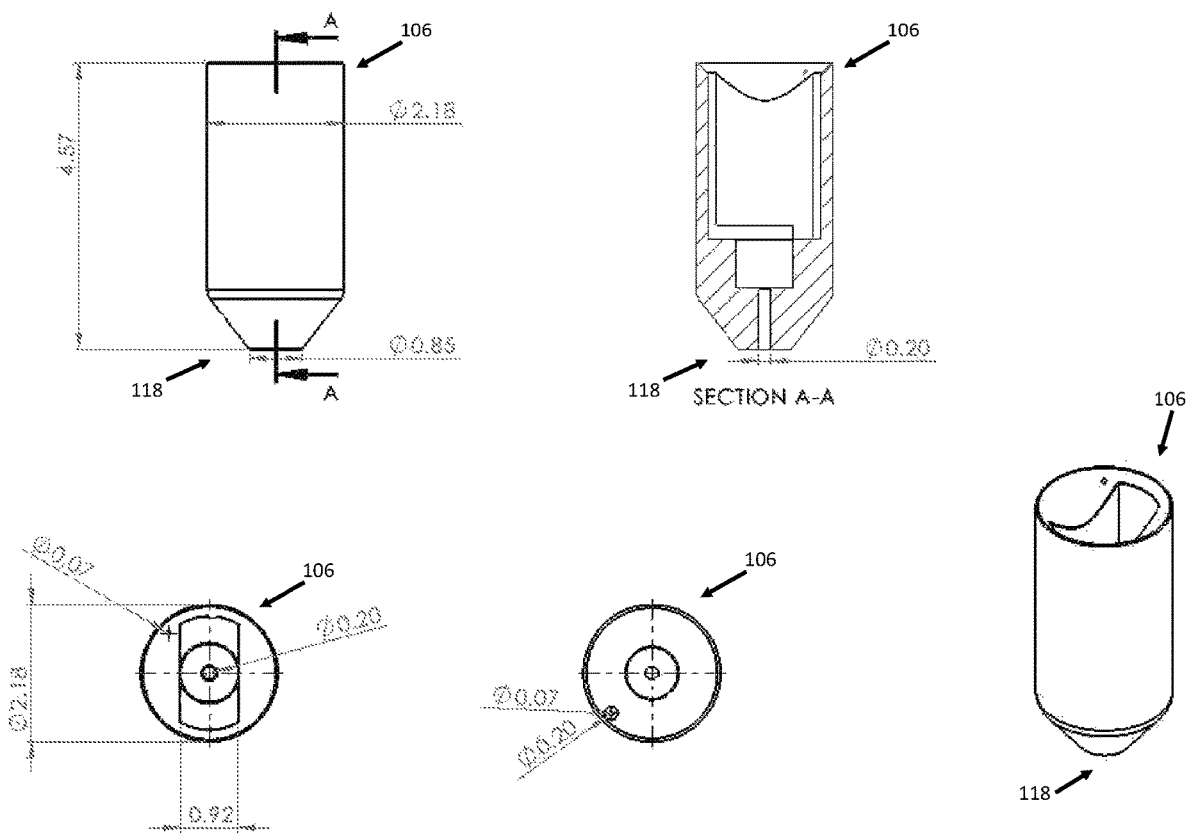
FIG. 4 is a collection of diagrams illustrating various features of a mounting component included in the RO filter systems illustrated in FIGS. 1, 2, and 3.

In FIG. 4, various dimensions and/or shapes for the mounting components 106A, 106B, and 106C (also simply referred individually, in various groups, or collectively as mounting component(s) 106) are shown in the various diagrams. FIG. 4 also illustrates various embodiments and the positional relationship of the fluid outlets 118A, 118B, and 118C (also simply referred individually, in various groups, or collectively as fluid outlet(s) 118).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A reverse osmosis (RO) filter system, comprising:
a pre-filter component comprising one of a cotton material or a cotton-blend material, the one of the cotton material or the cotton-blend material configured to filter elements having a size of at least 1 micron;
a filter component coupled to and in fluid communication with the pre-filter component;
an RO filter coupled to and in fluid communication with the filter component;
an end cap filter component comprising a charcoal component and a solid carbon component, the end cap filter component coupled to and in fluid communication with the RO filter; and
a mounting component detachably couplable to and in fluid communication with the end cap filter component and detachably couplable to and in fluid communication with a fluid target,
wherein:
the filter component is coupled between the pre-filter component and the RO filter, and
the mounting component forms a fluid outlet to the fluid target from the RO filter system when coupled to the end cap filter component and the fluid target.

2. The RO filter system of claim 1, further comprising:
a filter housing that houses the pre-filter component, the filter component, and the RO filter.

3. The RO filter system of claim 1, wherein the mounting component comprises a tubular shape and is configured to detachably couple to the fluid target.

4. The RO filter system of claim 1, wherein the pre-filter component comprises the cotton-blend material.

5. The RO filter system of claim 1, wherein the pre-filter component comprises the cotton material.

6. The RO filter system of claim 1, wherein the pre-filter component comprises the cotton-blend material.

7. A reverse osmosis (RO) filter system, comprising:
a pre-filter component comprising one of a cotton material or a cotton-blend material, the one of the cotton material or the cotton-blend material configured to filter elements having a size of at least 1 micron;
a fluid turbine component comprising a plurality of blades configured to control flow of a liquid;
an RO filter coupled to and in fluid communication with the fluid turbine component; an end cap filter component comprising a charcoal component and a solid carbon component, the end cap filter component coupled to and in fluid communication with the RO filter; and
a mounting component detachably couplable to and in fluid communication with the end cap filter component and detachably couplable to and in fluid communication with a fluid target,
wherein:
the mounting component forms a fluid outlet to the fluid target from the RO filter system when coupled to the RO Filter end cap filter component and the fluid target.

8. The RO filter system of claim 7, further comprising:
a filter component coupled between the pre-filter component and the fluid turbine component,
wherein:
the filter component is coupled to and in fluid communication with the pre-filter component and the fluid turbine component, and
the fluid turbine component is coupled between the filter component and the RO filter.

9. The RO filter system of claim 8, further comprising:
a filter housing that houses the pre-filter component, the filter component, the fluid turbine component, and the RO filter.

10. The RO filter system of claim 9, wherein:
the mounting component is coupled to and in fluid communication with the end cap filter component.

11. The RO filter system of claim 10, wherein the mounting component comprises a tubular shape and is configured to detachably couple to the fluid target.

12. The RO filter system of claim 7, wherein the plurality of blades include an angle in the range of 18° to 34°.

13. The RO filter system of claim 7, wherein the pre-filter component comprises the cotton material.

14. The RO filter system of claim 7, wherein the pre-filter component comprises the cotton-blend material.

15. A reverse osmosis (RO) filter system, comprising:
a filter component;
an RO filter coupled to and in fluid communication with the filter component;
an end cap filter component comprising a charcoal component and a solid carbon component, the end cap filter component coupled to and in fluid communication with the RO filter; and
a mounting component detachably couplable to and in fluid communication with the end cap filter component and detachably couplable to and in fluid communication with a fluid target,
wherein:
the RO filter is coupled between the filter component and the end cap filter component, and
the mounting component forms a fluid outlet to the fluid target from the RO filter system when coupled to the end cap filter component and the fluid target.

16. The RO filter system of claim 15, further comprising:
a fluid turbine component coupled between the filter component and the RO filter,
wherein:
the fluid turbine component is in fluid communication with the filter component and the RO filter, and
the fluid turbine component comprises a plurality of blades configured to control flow of a liquid to the RO filter.

17. The RO filter system of claim 16, further comprising:
a filter housing coupled to and in fluid communication with the mounting component, wherein the filter housing houses the filter component, the fluid turbine component, and the RO filter.

18. The RO filter system of claim 15, wherein the mounting component comprises a tubular shape and is configured to detachably couple to the fluid target.

19. The RO filter system of claim 16, wherein the plurality of blades include an angle in the range of 18° to 34°.

20. The RO filter system of claim 16, wherein the plurality of blades include an angle of 22.5°.

* * * * *